March 7, 1933. J. T. DOURGNON 1,900,436
SYSTEM OF INDIRECT LIGHTING OF ALL SPACES
Filed April 18, 1929  2 Sheets-Sheet 1
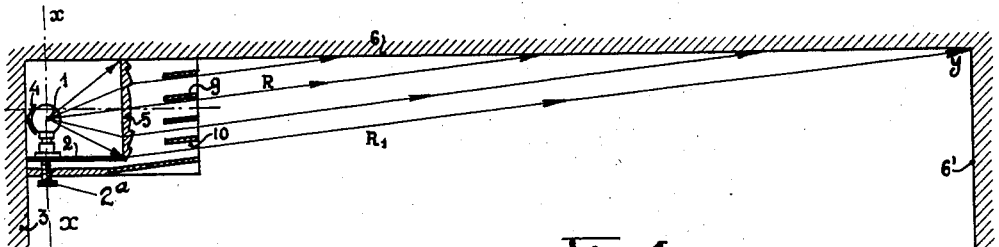
Fig.1
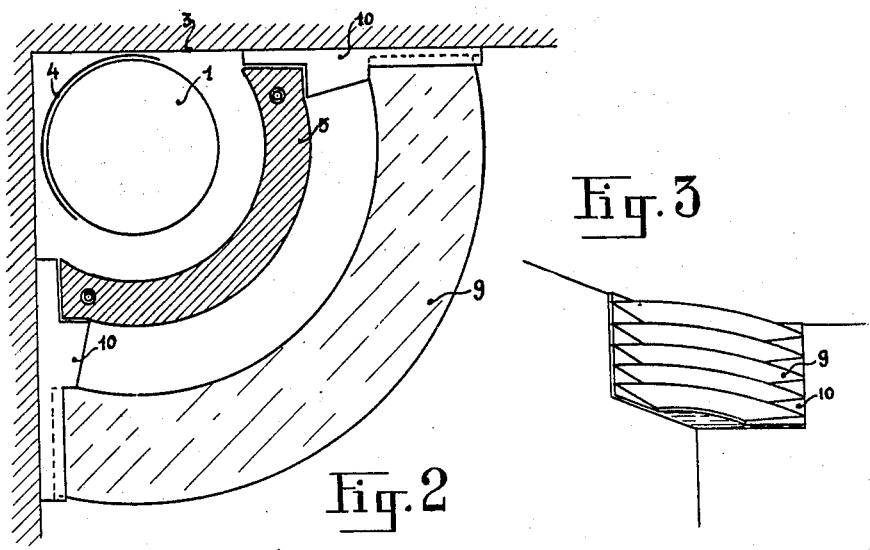
Fig.2
Fig.3
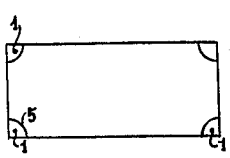
Fig.4
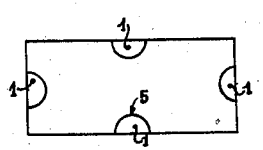
Fig.5
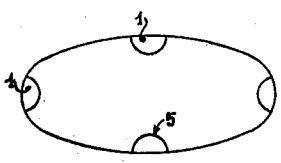
Fig.6
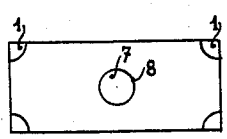
Fig.7
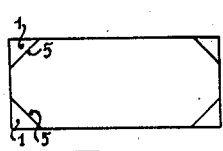
Fig.8
Inventor
Jean Siprane Dourgnon
By D. Singer, Atty.

March 7, 1933. J. T. DOURGNON 1,900,436
SYSTEM OF INDIRECT LIGHTING OF ALL SPACES
Filed April 18, 1929 2 Sheets-Sheet 2

Inventor
Jean Tigrane Dourgnon
By B. Singer, Atty.

Patented Mar. 7, 1933

1,900,436

UNITED STATES PATENT OFFICE

JEAN TIGRANE DOURGNON, OF PARIS, FRANCE

SYSTEM OF INDIRECT LIGHTING OF ALL SPACES

Application filed April 18, 1929, Serial No. 356,150, and in France April 25, 1928.

This invention has for its object to provide a system of indirect lighting of all kind of rooms, premises and the like, provided with a diffusing surface constituted either by the ceiling or by any other surface such as a wall or a specially provided panel or the like.

The system according to this invention, comprises the combination of luminous sources joined to the diffusing surface, for example a ceiling or the like, in an appropriate number so as to prevent the formation of shadows upon the surface and due to the irregularities of the same, with one or several optical reflecting or refracting systems.

This system directs the luminous rays emitted by the lamps in planes parallel to each other so that the rays impinge upon the diffusing surface, in combination with directing devices preventing glare and adapted to participate in the decoration of the place to be lighted, in order to direct the totality of the luminous flux emitted by the light-sources upon the diffusing surface which reflects this flux anew into the place to be lighted.

The annexed drawings represent diagrammatically examples of installations effected according to the invention.

Fig. 1 represents diagrammatically a vertical section through a ceiling and a corresponding luminous source;

Fig. 2 is a diagrammatic horizontal section, on a larger scale, showing the arrangement of a luminous source and of corresponding anti-glaring screens for a luminous source in a corner;

Fig. 3 is a diagrammatic perspective view showing the arrangement of luminous sources and screens according to Fig. 2 in the corner of a ceiling;

Figs. 4 to 8 are diagrammatic plane views showing the arrangement of the luminous sources according to the invention around a ceiling;

Figure 9:
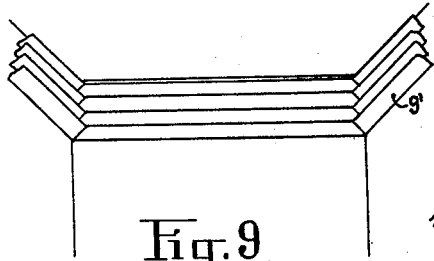
Fig. 9 is a perspective view of screens extending along the walls.
Figure 10:
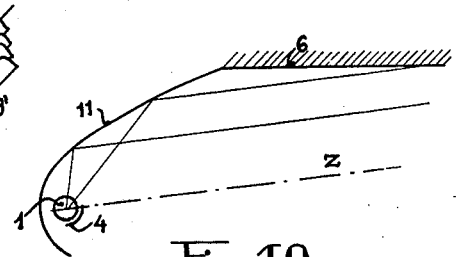
Figs. 10 to 14 illustrate a few examples of optical reflecting and refracting systems which can be used in the present invention.
Figure 11:
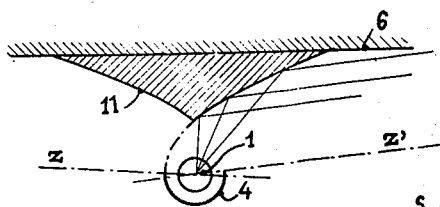
Figure 12:
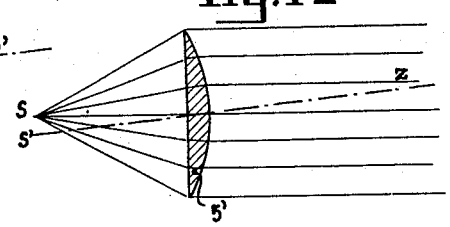
Figure 13:
Figure 14:
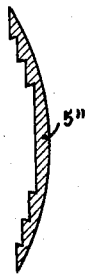

My improved lighting apparatus is formed, as shown in Fig. 1, by a lamp 1 which may be an electric lamp, a gas-burner or any other kind of lamp of appropriate design and suitable power, mounted in a support 2 suitably fixed to the corresponding vertical wall 3. The lamp 1 is preferably provided with a spherical mirror 4 placed close to the wall and is preferably mounted in such manner that it can be displaced along its vertical axis for adjustment, as may be required, as by a screw 2a.

In front of the lamp 1 is disposed an appropriate optical system or lens 5 of such kind as to direct the luminous rays emitted by the lamp 1 as well as those emitted by or reflected by the mirror 4 in planes parallel or nearly parallel to one another and in such manner that they impinge upon the ceiling 6 as clearly shown in Fig. 1, so as to obtain a reflection by the ceiling of the luminous rays striking thereon.

In the example shown the refracting optical system, 5 is formed by a portion of a toric lens engendered by the rotation around the vertical axis $x$—$x$ containing the luminous source, and having a stepped section of a known kind.

After installation of the apparatus it will suffice to direct the luminous rays toward the ceiling 6 by the inclination of the apparatus in such manner that the last rays $R_1$ are directed to a point $y$ nearest to the line of intersection of the ceiling 6 and the wall 6' opposite to the apparatus.

This regulation is effected by any suitable means by lowering the lamp and its filament upon the axis $x$—$x$. Practically this regulation is effected by the observation of the upper part of the walls receiving the luminous bundle R. The apparatus is adjusted in such manner that substantially no direct light is thrown upon the walls and that the diffusing surface is lighted as uniformly as possible.

In order to avoid shadows occasioned by irregularities of the ceiling and by the granulations incident to the painting or coating of the ceiling, it is advisable to place the luminous sources constituted by lamps such as 1, in suitable opposite directions.

According to Fig. 4 the lamps are, for example, disposed in the four corners of a rectangular ceiling. They could, according to Fig. 5, be disposed in the middle of the borders of the ceiling. But whereas according to Fig. 4 the optical system 5 of each lamp is in the shape of a quarter of the circumference, these optical systems assume for the arrangement according to Fig. 5 the shape of half of a circle. Fig. 6 shows the arrangement for an elliptical ceiling.

It is possible, as indicated in Fig. 7, to provide, besides the corner-lights or the lights in the middle of the borders, a central light 7 upon the ceiling, the optical system of this light presenting the shape of a circle.

The direction of the luminous rays is the same in all vertical planes passing through the vertical axis $x$—$x$ of the optical system, the apparatus producing a luminous beam whose opening is 90° or 180° or 360° according to the position imparted to the apparatus, viz. either in an angle, or along the ceiling or in its middle (in which latter case the mirror is of course useless).

If the optical systems are cut, they could be made visible because the luminous rays do not move away from their theoretical travelling direction and there is no possibility of diffusion.

If using an optical system which is not very exact, for example one consisting of moulded glass, certain rays will move away from their theoretical direction (by the diffusion at the surface of the glass or by any other reason) and will result in objectionable glare. To avoid this objection, screens 9 are placed (Figs. 1 and 2) in the proximity of each lamp 1 and outwardly of the optical system 5, these screens being parallel between themselves and preferably parallel to the central rays of the bundle R, and being arranged to arrest or to diffuse the luminous rays directed downwardly and to throw them toward the ceiling. These screens are constituted by lamels of suitable material, opaque or translucid (ground glass, opaline glass, alabaster and so on), and preferably decorated. The lower face of these screens is preferably frosted or the like, so as to avoid glare.

The said lamels are supported at their extremities in suitably shaped fittings fixed to the corresponding walls. In this way a luminous source for the corners will be obtained corresponding to Fig. 2.

These screens or lamels can be shaped in any manner, for example as conical bodies whose axis of revolution $x$—$x$ passes through the lamp or flat wings as $g$ in Fig. 2, extending along the wall, and so on.

Owing to the described arrangement an entirely indirect lighting of the space will be obtained, since the ceiling is illuminated by the greater portion of the flux emitted by the different luminous sources, the illuminating fluxes of these sources having, if necessary, suitably opposite directions in order to suppress all shadows, the parts of the wall and of the ceiling limited by the optical system 5 being covered with a black coating or any other absorbing coating.

It is also possible to utilize the reflection of these parts of the walls for the general lighting of the piece, by coating them with a clear color.

By suitably coloring the said parts of the walls and of the ceiling, it is possible to obtain, starting at one part by the luminous flux obtained by a single lamp, a luminous non-colored flux directed toward the ceiling by the optical system 5 and by the screens or wings 9, and, at the other part, a colored flux diffused by the walls situated at the rear of each luminous source, the whole apparatus acquiring thereby the aspect of a coloured source, whereas the luminous flux emitted by the said source toward the ceiling is not coloured.

The reflecting or refracting optical system 5 utilized in combination with each lamp can be as above specified, either a reflecting or a refracting system or a system resulting from both preceding systems. The Figs. 10 to 14 illustrate certain optical systems applied in the present invention.

In most cases the optical system will be, as in the example (Fig. 1), a surface or volume of revolution around the axis $x$—$x$ passing through the source 1 and perpendicular to the surface of diffusion.

In case of employment of a reflecting surface, the generatrix can be either a segment of a parabola 11 (Fig. 10) in the case of a corner-apparatus, or in the case of a middle apparatus (Fig. 11), the axis $z$—$z'$ of the parabola which is more or less inclined with regard to the horizontal line, or any other curve, or any curve judiciously calculated to assure a uniform illumination of a diffusing surface—ceiling 6 for example —of given dimensions.

In the case of employment of a refractive system, the volume can be obtained by the revolution around an axis $x$—$x$ of a simple lenticular section 5' (Fig. 12) or a stepped section 5 (Figs. 1, 13 and 14) with or without catadioptric rings, this system in gendering parallel rays in each meridia plane (a point-like source being supposed) or of a prismatic section, or of any other section specially calculated to produce a uniform lighting of the diffusing surface.

In all cases adjusting means are provided as specified above, permitting the displacement of the optical source (supposed as point) from S to S' with regard to the optical system (Fig. 12) so as to deviate the o tical axis z in order to illuminate better the diffusing surface 6.

Mirrors 4 with spherical surfaces can be added to all these optical systems, in order to recuperate the flux lost otherwise.

The apparatus, and more especially the central apparatus 7, 8 (Fig. 7) can be surrounded by glass bodies with vertical flutes whose purpose is:

(a) To suppress the shadows engendered by the fittings situated eventually in front of the apparatus and to increase at the same time the opening of the bundle of rays in the vertical direction;

(b) To permit an increase of the intensity in a given direction by a judicious disposition of the flutes.

Finally, instead of obtaining the optical system by the revolution around the vertical axis x—x, it could be obtained by the translation, along a rectilinear directrix or the like, of the sections defined above, the directrix being, for example, perpendicular to the bisectrix of the angle of the corresponding walls, as in the diagrammatic disposition of Fig. 8.

Figure 15:
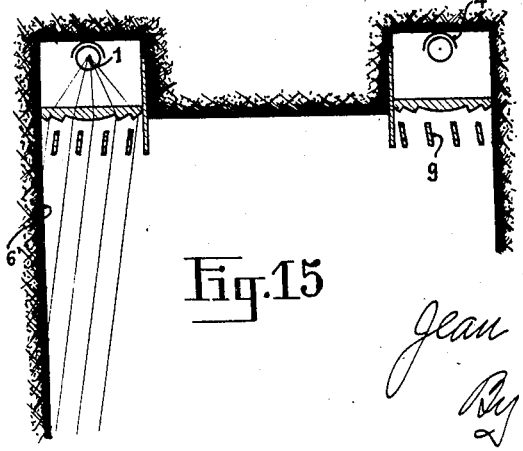
Fig. 15 shows in a vertical diagrammatic section an arrangement for indirect lighting of the walls.

It must be understood that by indirect lighting is meant, not only the lighting through the medium of the ceiling acting as a diffusing surface but also, as specified, the lighting through the medium of any other diffusing surface such as vertical walls 6', as in Fig. 15, or panels specially provided for this purpose.

According to Fig. 15, the walls 6' play with regard to the apparatus the rôle played by the ceiling 6 in the example of Fig. 1, the luminous bundle emitted by the lamps 1 and directed by the optical systems 5 being inclined with regard to the vertical direction so as to raze the wall 6'.

The surfaces illuminated by the razing rays can be either flat or slightly curved, the uniformity of lighting being thereby susceptible to be still further increased.

What I claim is:

1. A system for indirect illumination of a localized space, comprising a diffusing surface forming a secondary light source, a primary source of light adjacent said diffusing surface and an optical dioptric, exclusively refractive; device to direct the light rays from the primary light source exclusively against said diffusing surface at a slight angle to said diffusing surface and substantially parallel to one another said optical device being obtained by rotation about an axis substantially normal to the said diffusing surface of a lenticular stepped contour, furnishing rays which define cones or segments of cones, whose bases are on the said surface and whose apices are at the light projector.

2. An indirect illumination system as set forth in claim 1, including means to intercept the luminous rays which do not directly reach the diffusing surfaces, said means being screens in the form of rotation elements having the same axis as the optical system and other means for absorbing the rays diffused toward the rear of the luminous source on the wall sections and the bases limited by the optical system.

3. An indirect illumination system as set forth in claim 1, including means for regulating the lamp along the axis of revolution of the optical system.

4. An indirect illumination system comprising a diffusing surface forming a secondary light source, a primary source of light adjacent said diffusing surface, means to direct the light rays from the primary light source against said diffusing surface at a slight angle to said diffusing surface and substantially parallel to one another and means to intercept the luminous rays which do not directly reach the diffusing surfaces, said means being screens in the form of rotation elements having the same axis as the optical system.

5. An indirect illumination system as set forth in claim 4, including means for regulating the lamp along the axis of revolution of the optical system to modify the characteristic features of the pencil of rays refracted and to permit by said means the use of the same optical system for illuminating the secondary surfaces of entirely different dimensions.

In witness whereof I affix my signature.

JEAN TIGRANE DOURGNON.